United States Patent
Kwon et al.

(10) Patent No.: US 8,818,391 B2
(45) Date of Patent: Aug. 26, 2014

(54) COMMUNICATION SYSTEM WITH FEMTOCELLS AND AN INTERFERENCE CONTROL METHOD THEREFOR

(75) Inventors: Il Won Kwon, Ansan-si (KR); Yung Soo Kim, Seongnam-si (KR); Mi Sun Do, Suwon-si (KR); Jung Hee Han, Seoul (KR); Hee Jung Byun, Anyang-si (KR); Jung Min So, Seoul (KR)

(73) Assignee: Samsung Electronics Co., Ltd (KR)

( * ) Notice: Subject to any disclaimer, the term of this patent is extended or adjusted under 35 U.S.C. 154(b) by 766 days.

(21) Appl. No.: 12/721,035

(22) Filed: Mar. 10, 2010

(65) Prior Publication Data
US 2010/0234039 A1    Sep. 16, 2010

(30) Foreign Application Priority Data

Mar. 10, 2009 (KR) .................. 10-2009-0020098

(51) Int. Cl.
*H04W 72/00* (2009.01)
*H04W 48/12* (2009.01)
*H04W 52/24* (2009.01)
*H04W 84/04* (2009.01)
*H04W 16/32* (2009.01)

(52) U.S. Cl.
CPC ............ *H04W 48/12* (2013.01); *H04W 84/045* (2013.01); *H04W 16/32* (2013.01); *H04W 52/244* (2013.01)
USPC ..................... 455/452.2; 455/452.1; 455/450; 455/444; 455/435.1; 455/422.1

(58) Field of Classification Search
CPC ...... H04W 24/00; H04W 28/04; H04W 28/18
USPC ............... 455/452.1, 450, 444, 435.1, 422.1, 455/452.2
See application file for complete search history.

(56) References Cited

U.S. PATENT DOCUMENTS

| 6,870,816 B1 * | 3/2005 | Edwards et al. ............... 370/252 |
| 7,145,890 B1 * | 12/2006 | Seo et al. ....................... 370/331 |
| 7,990,912 B2 * | 8/2011 | Nix et al. ....................... 370/328 |

(Continued)

FOREIGN PATENT DOCUMENTS

| CN | 1636359 | 7/2005 |
| JP | 10-023519 | 1/1998 |
| JP | 2005-012806 | 1/2005 |
| WO | WO 2009/022534 | 2/2009 |

OTHER PUBLICATIONS

Qualcomm Europe, "New Interference Scenarios in LTE-Advanced", R1-082556, 3GPP TSG-RAN WG1 #53bis, Jul. 4, 2008.

(Continued)

*Primary Examiner* — Nghi H Ly
(74) *Attorney, Agent, or Firm* — The Farrell Law Firm, P.C.

(57) ABSTRACT

A wireless communication system with femtocells and a method for mitigating inter-cell interference in the wireless communication system are provided. The interference control method includes notifying a mobile station of entry to a home cell, when the mobile station enters a macrocell including a femto base station with which the mobile station is registered, transmitting, by the mobile station, a femtocell driving control message to the femto base station at a predetermined transmission power, when the mobile station enters a femtocell of the femto base station, and switching on, by the femto base station, a transmitter, when the femtocell driving control message is received.

20 Claims, 6 Drawing Sheets

(56) References Cited

U.S. PATENT DOCUMENTS

| | | | |
|---|---|---|---|
| 8,230,035 B2* | 7/2012 | Morgan et al. | 709/213 |
| 2002/0006120 A1* | 1/2002 | Suzuki et al. | 370/329 |
| 2004/0259528 A1 | 12/2004 | Gandhi et al. | |
| 2007/0189261 A1* | 8/2007 | Choi et al. | 370/347 |
| 2008/0244148 A1 | 10/2008 | Nix, Jr. et al. | |
| 2008/0261602 A1 | 10/2008 | Livneh | |
| 2009/0042593 A1* | 2/2009 | Yavuz et al. | 455/522 |
| 2009/0047931 A1 | 2/2009 | Nanda et al. | |
| 2009/0052395 A1 | 2/2009 | Bao et al. | |
| 2011/0116476 A1* | 5/2011 | Lee et al. | 370/331 |
| 2011/0130143 A1 | 6/2011 | Mori et al. | |

OTHER PUBLICATIONS

Mitsubishi Electric, "Dynamic Setup of HNBs for Energy Savings and Interference Reduction", R3-080658, 3GPP TSG RAN WG3 Meeting #59bis, Apr. 3, 2008.

* cited by examiner

COMMUNICATION SYSTEM WITH FEMTOCELLS AND AN INTERFERENCE CONTROL METHOD THEREFOR

PRIORITY

This application claims priority under 35 U.S.C. §119(a) to a Korean Patent Application, which was filed on Mar. 10, 2009 and assigned Korean Patent Application No. 10-2009-0020098, the content of which is incorporated herein by reference.

BACKGROUND OF THE INVENTION

1. Field of the Invention

The present invention relates generally to wireless communications and, in particular, to a wireless communication system with femtocells and a method for mitigating inter-cell interference in the wireless communication system.

2. Description of the Related Art

A cellular communication system includes a plurality of macro cells, each defined by a coverage area of a macro base station and providing communication service to mobile stations within the coverage area. Typically, the mobile stations experience different signal environments even within the same macro cell. However, the macro base station serves the mobile stations without taking into account mobile station-specific signal environments, resulting in service quality degradation and delay. In order to mitigate these problems, service providers deploy intermediate devices, such as repeater and remote units for relaying signals between base stations and mobile stations. Because the macro base stations and intermediate devices are the service provider properties, the deployment of intermediate devices increases the business cost and system implementation complexity.

In order to solve these problems, the current communication systems are designed to support femto base stations that can be installed overlappingly within a macro cell. A femto base station is a small cellular base station that can be installed in residential or small business environments as needed. Because the femtocell is installed on the user's premises, it is possible to improve an indoor signal environment and service quality without increasing a fixed infrastructure cost of the service provider.

FIG. 1 illustrates a conventional wireless communication system including femtocells installed within a macrocell.

Referring to FIG. 1, multiple femto base stations 21 are installed within a macro cell of a macro base station 11. Consequently, signals of the macrocell and the femto cells are likely to interfere with each other. Generally, base stations are installed at optimum positions for each specific base station, and it is difficult install the base stations in consideration of the probability of interferences among each other. For example, because each femto base station 21 uses an omni-directional antenna, the mobile station 31 served by the femto base station 21 is likely to receive signals transmitted by the macro base station 11 and the other femto base station 21, resulting in interference. Also, the signals transmitted by neighbor femto base stations can act as interference to the mobile station 31.

SUMMARY OF THE INVENTION

In order to address at least the problems of the prior art discussed above, an aspect of the present invention is to provide a method for controlling interference between macro and femto cells in a wireless communication system, wherein the macro and femto cells are overlappingly deployed.

In accordance with an aspect of the present invention, a communication system for controlling interference between macro and femto cells in a wireless communication system is provided, The communication system includes a femto base station that defines a femtocell and includes a transmitter for serving at least one mobile station preregistered with the femto base station; and a macro base station that defines a macrocell including the femto base station, and notifies the mobile station of entry to a home cell, when a mobile station enters the macrocell. The femto base station switches on the transmitter, which is previously switched off to control interference by the femto base station, when a femtocell driving control message transmitted by the mobile station is received.

In accordance with another aspect of the present invention, an interference control method for a wireless communication system including femto and macro base stations is provided. The method includes notifying, by the macro base station, a mobile station of entry to a home cell, when the mobile station enters a macrocell having a femto base station with which the mobile station is registered; transmitting, by the mobile station, a femtocell driving control message to the femto base station at a predetermined transmission power within the home cell; and switching on, by the femto base station, a transmitter, which is previously switched off to control interference by the femto base station, when the femtocell driving control message is received.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention will be described in detail herein below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

Figure 1:
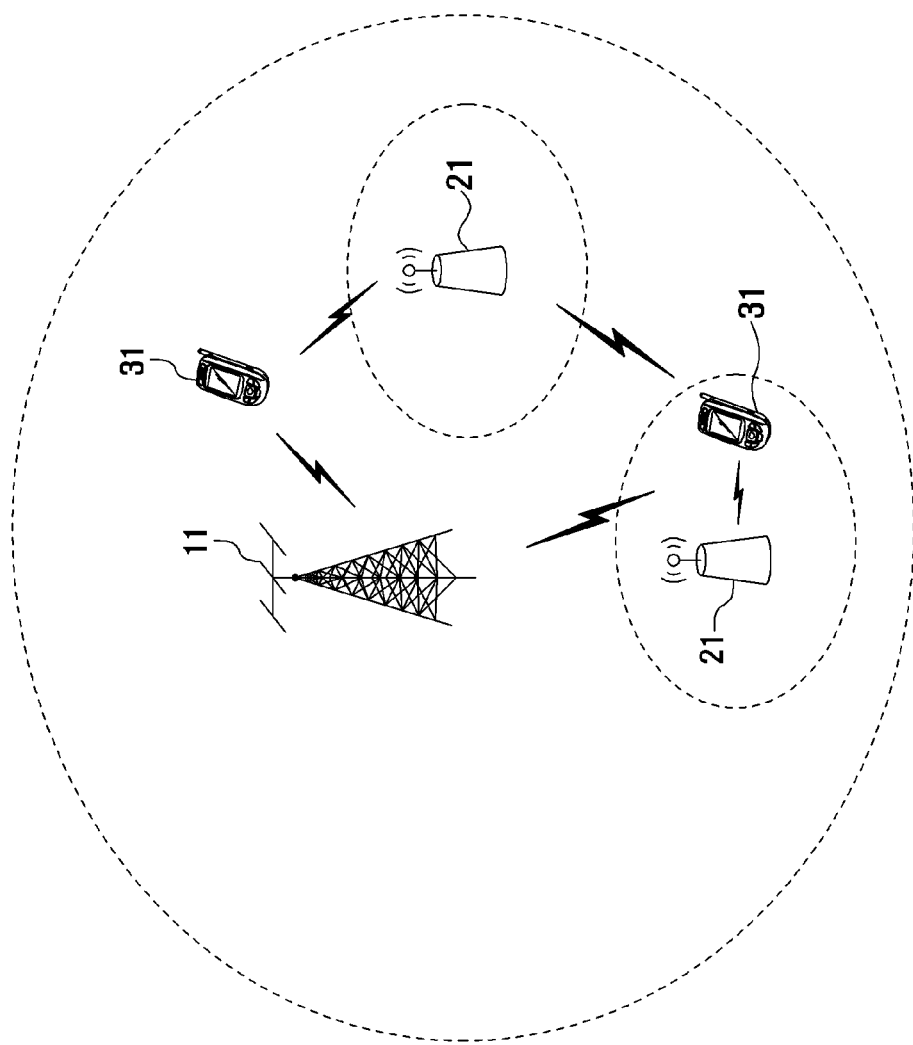
FIG. 1 illustrates a conventional wireless communication system including femtocells installed within a macrocell.
Figure 2:
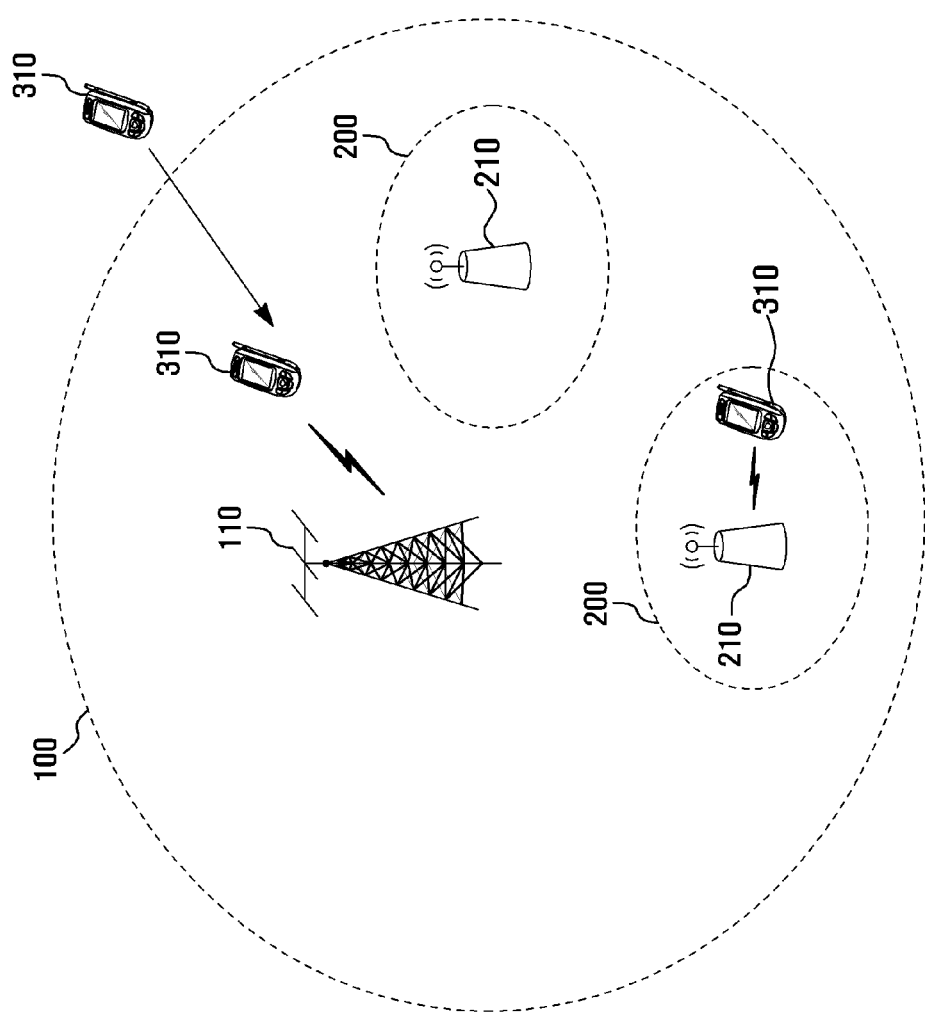
FIGS. 2 and 3 are schematic diagrams illustrating a macrocell and femtocells of a wireless communication system according to an embodiment of the present invention.
Figure 3:
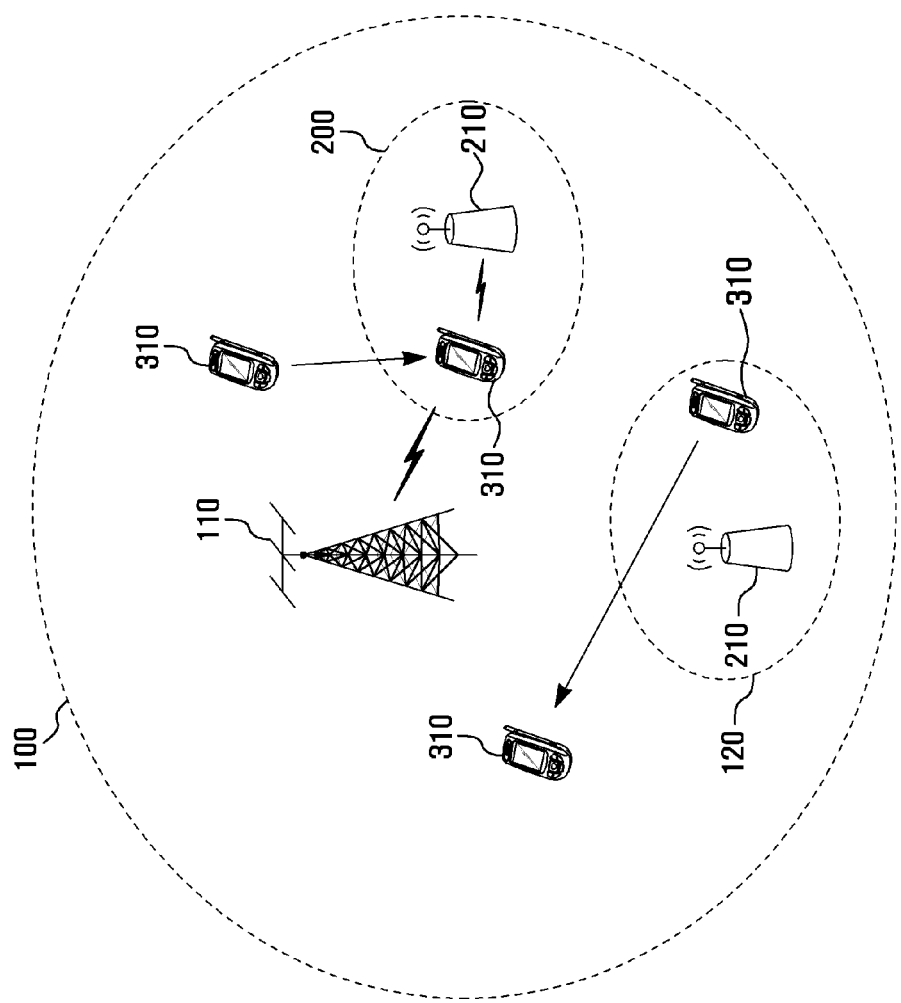

FIGS. 2 and 3 are schematic diagrams illustrating a macrocell and femtocells of a wireless communication system according to an embodiment of the present invention.

Referring to FIGS. 2 and 3, the communication system includes a macro base station 110 defining a macrocell 100, a plurality of femto base stations 210 defining respective femtocells 200 and deployed within the macro cell 100, and a plurality of mobile stations 310 which can move within the macro cell 100 and across the boundary of the femtocells 200. The macro base station 110 and the femto base stations 210 can communicate with each other directly or indirectly.

The mobile station 310 connects to the macro base station 110 within the macrocell 100. If the mobile station 310 moves into a femtocell 200, it performs a handover to the femto base station 210. The mobile station 310 can be preregistered with the corresponding femto base station 210. Accordingly, the mobile station 310 can be served by the macro base station 110 or the femto base station 210.

The femto base station 210 turns on or off its transmitter depending on whether any mobile station is located within its radio coverage area, i.e., within the femto cell 200. Accordingly, when the mobile station 310 moves out of the femto cell 200, as illustrated in FIG. 3, the femto base station 210 switches off its transmitter. In contrast, when the mobile station 310 registered with the femto base station 210 moves into the femtocell 200, as illustrated in FIG. 3, the femto base station 210 switches the transmitter power on to serve the mobile station 310.

The mobile station 310 transmits a Femtocell Transmission Power On/off (FTPO) message to the femto base station 210 to switch on the transmitter of the femto base station 210, when it enters the corresponding femto cell 200. Alternatively, the macro base station 110 may transmit the FTPO message to the femto base station 210, when the mobile station 310 enters a registered femto cell 200. The mobile station 310 may transmit the FTPO message at a predetermined transmission power. Accordingly, when the FTPO message is received through a femto base station receiver, the femto base station 210 switches on its transmitter.

Figure 4:
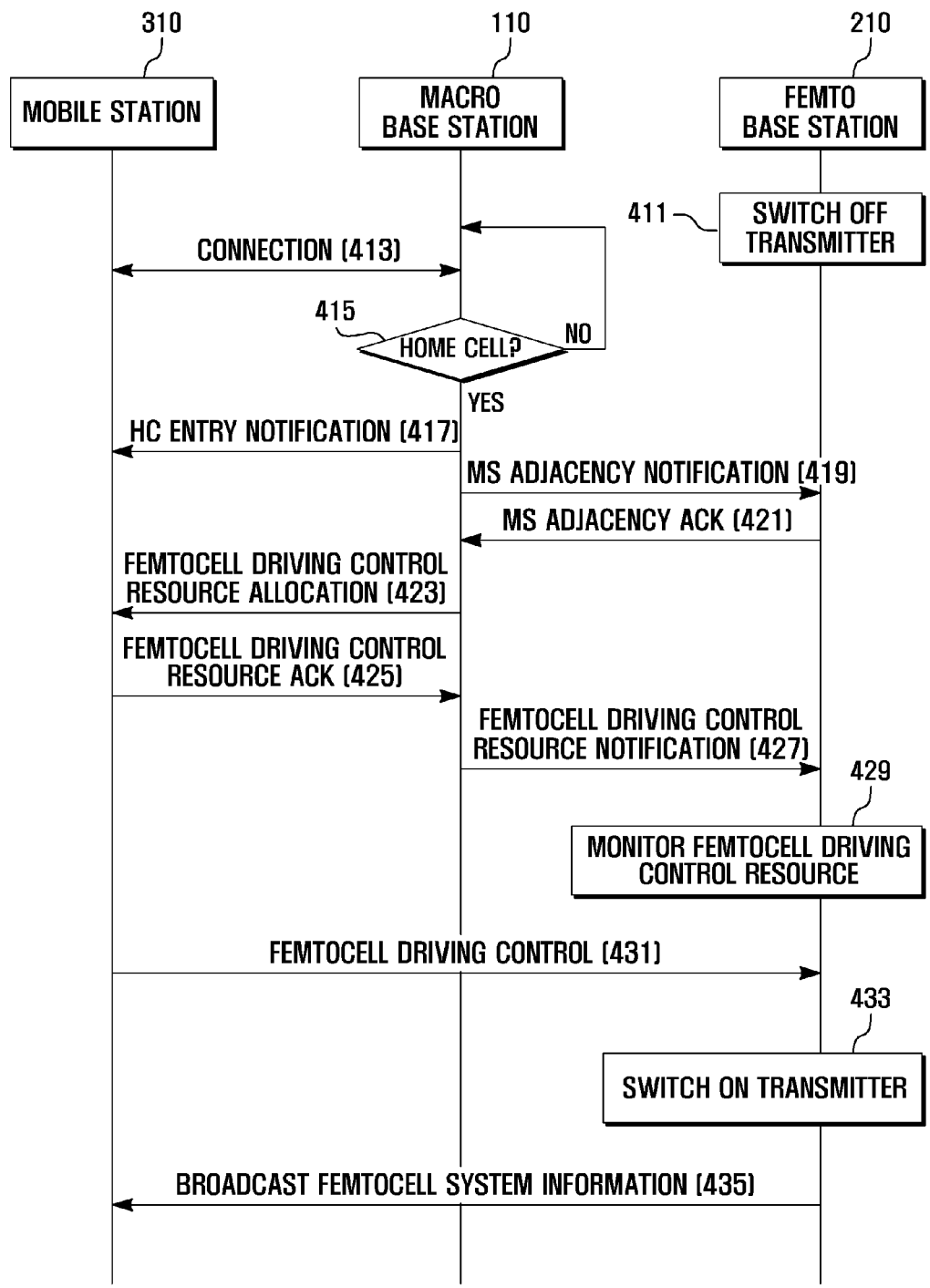
FIG. 4 is a sequence diagram illustrating operations of a mobile station, a macro base station, and a femto base station in an interference control method according to an embodiment of the present invention.

FIG. 4 is a sequence diagram illustrating operations of a mobile station, a macro base station, and a femto base station in an interference control method according to an embodiment of the present invention. In FIG. 4, it is assumed that the macro base station 110 and the femto base station 210 can communicate with each other directly.

Referring to FIG. 4, in step 411, the femto base station 210 maintains its transmitter in off-state before the entry of the mobile station 310 is detected. In step 413, the mobile station 310 enters the macro cell 100 and connects to the macro base station 110. More specifically, when the mobile station 310 enters the macro cell 100, the macro base station 110 establishes a connection to serve the mobile station 310. Therefore, the macro base station 110 provides communication service to the mobile station 310 within the macro cell 100.

After the mobile station 310 connects to the macro base station 110, the macro base station 110 determines whether it is the Home Cell (HC) of the mobile station 310 in step 415. That is, the macro base station 110 determines whether a femto base station 210 with which the mobile station 310 has been registered is located within the macrocell 100. If the femto base station 210 is located within the macrocell 100, this means that the macro cell 110 is the HC of the mobile station 310. For this purpose, the macro base station 110 may have a femtocell list including information on femtocells installed within the macro cell 100 and femtocell-specific mobile station lists, each including information on mobile stations registered therewith.

When the macro base station 110 is the HC of the mobile station 310, the macro base station 110 sends an HC entry notification message to the mobile station 310 in step 417, notifying the mobile station 310 that the mobile station 310 is connected to its HC. The HC entry notification message can be the HC Indication (HCI) message.

In step 419, the macro base station 110 sends an MS adjacency notification message to the femto base station 210 with which the mobile station has registered, informing the femto base station 210 of the entry of the preregistered mobile station 310.

In step 421, the femto base station 210 sends an MS adjacency ACKnowledgement (ACK) message to the macro base station 110, in response to the MS adjacency notification message. That is, the femto base station 210 acknowledges that the adjacency of the mobile station 310 based on the MS adjacency notification message.

When the MS adjacency ACK message has been received, the macro base station 110 sends a femtocell driving control resource allocation message to the mobile station 310 in step 423. The macro base station 110 allocates the resource for the mobile station 310 to transmit a femtocell driving control message.

When the femtocell driving control resource allocation message has been received, the mobile station 310 sends a femtocell driving control resource ACK message to the macro base station 110 in step 425. More specifically, the mobile station 310 checks the resource allocated by means of the femtocell driving control resource allocation message, and replies to the macro base station 110.

When the femtocell driving control resource ACK message has been received, the macro base station 110 sends a femtocell driving control resource notification message to the femto base station 210 in step 427, notifying the femto base station 210 of the resource allocated for the mobile terminal to control driving the femto base station 210.

After the femtocell driving control resource notification message has been received, the femto base station 210 monitors the femtocell driving control resource in step 429, waiting for a femtocell driving control message.

In step 431, the mobile station 310 transmits a femtocell driving control message on the femtocell driving control resource allocated by the macro base station 110. The mobile station 310 transmits the femtocell driving control message at a predetermined transmission power. Here, the transmission power can be set to a value such that the femto base station 210 can receive the femtocell driving control message when the mobile station 110 within radio coverage of the femto base station (i.e., femtocell). That is, the femto base station 210 can receive the femtocell driving control message transmitted by the mobile station 310, when the mobile station enters the femtocell. When the mobile station 310 is outside of the femtocell, the femto base station 210 cannot receive the femtocell driving control message transmitted by the mobile station 310. The femtocell driving control message includes a User Identifier (UID) for the femto base station 210 to identify the mobile station 310.

When the femtocell driving control message has been received, the femto base station 210 switches on its transmitter in step 433. More specifically, the femto base station 210 verifies the registration of the mobile station 310 based on the UID included in the femtocell driving control message. When it is verified that the mobile station 310 is registered with the femto base station 210, the femto base station 210 switches on its transmitter.

After switching on the transmitter, the femto base station 210 broadcasts the system information using the transmitter in step 435.

Consequently, the mobile station 310 connects to the femto base station 210 using the system information, and the femto base station 210 starts serving the mobile station 310. At this time, the mobile station 310 can be served by the macro base station 110 and the femto base station 210, selectively.

Although FIG. 4 illustrates the macro base station 110 separately transmitting the MS adjacency notification message and the femtocell driving control resource notification message to the femto base station 210, the present invention is not limited thereto. For example, the macro base station 110 may simultaneously transmits the MS adjacency notification message and the femtocell driving control resource notification message to the femto base station 210, when the femtocell driving control resource ACK message is received from the mobile station 310. That is, the interference control method of the present invention as described above, can be implemented without transmission of the MS adjacency ACK message in response to the MS adjacency notification message in step 421.

Further, although FIG. 4 has been described above under the assumption that the macro base station 110 and the femto base station 210 communicate directly with each other, the present invention as described above, is not limited thereto. For example, the macro base station 110 and the femto base station 210 may indirectly communicate with each other through another device.

Figure 5:
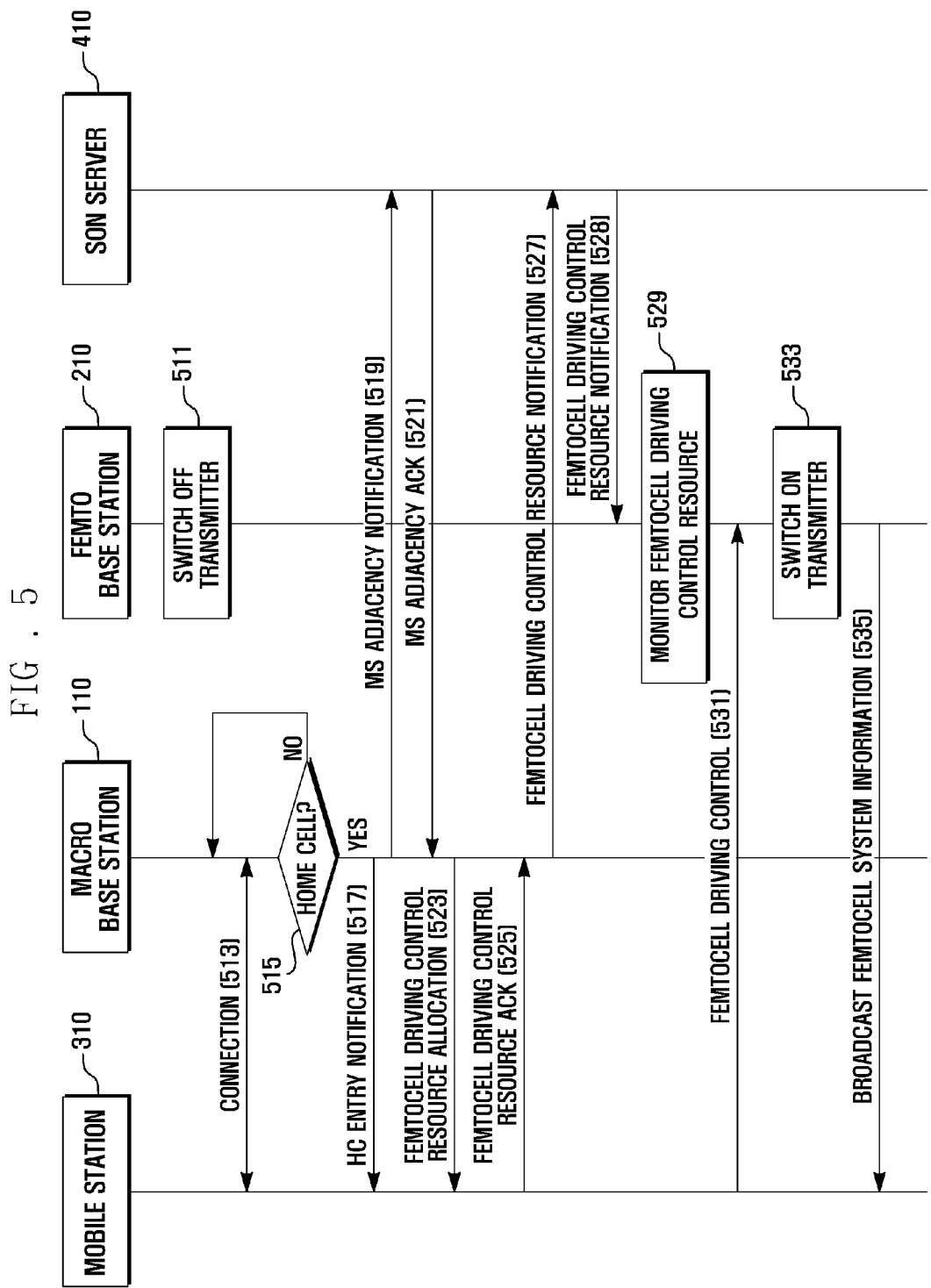
FIG. 5 is a sequence diagram illustrating operations of a mobile terminal, a macro base station, a femto base station, and a Self-Organizing Networks (SON) server in an interference control method according to an embodiment of the present invention.

FIG. 5 is a sequence diagram illustrating operations of a mobile terminal, a macro base station, a femto base station, and a Self-Organizing Networks (SON) server in an interference control method according to an embodiment of the present invention. In FIG. 5, it is assumed that the femto base station 210 is connected to the SON server 410 via a backbone network.

Referring to FIG. 5, in step 511, the femto base station 210 maintains its transmitter in off-state before the entry of the mobile station 310 is detected, i.e., when no mobile station is located in the femtocell, the femto base station 210 switches off its transmitter.

In step 513, the mobile station 310 accesses the macro base station. More specifically, the mobile stations 310 enters the macro cell 100 and connects to the macro base station 110. When the mobile station 310 enters the macro cell 100, the macro base station 110 establishes a connection to serve the mobile station 310. Therefore, the macro base station 110 provides communication service to the mobile station 310 within the macro cell 100.

After the mobile station 310 connects to the macro base station 110, the macro base station 110 determines whether it is the HC of the mobile station 310 in step 515. Step 515 is the same as step 415 in FIG. 4 described above.

When it is determined that the macro base station 110 is the HC of the mobile station 310, the macro base station 110 sends an HC entry notification message to the mobile station 310 in step 517, notifying the mobile station 310 that the mobile station 310 is connected to its HC. The HC entry notification message can be the HC Indication (HCI) message.

In step 519, the macro base station 110 sends an MS adjacency notification message to the SON server 410, informing the SON server 410 of the entry of the preregistered mobile station 310.

Upon receipt of the MS adjacency notification message, the SON server 410 sends an MS adjacency ACKnowledgement (ACK) message to the macro base station 110 in response to the MS adjacency notification message in step 521.

When the MS adjacency ACK message has been received, the macro base station sends a femtocell driving control resource allocation message to the mobile station 310 in step 523. More specifically, the macro base station 110 allocates the resource for the mobile station 310 to transmit a femtocell driving control message and transmits information about the allocated resource in the femtocell driving control resource allocation message to the mobile station 310. When the femtocell driving control resource allocation message has been received, the mobile station 310 sends a femtocell driving control resource ACK message to the macro base station 110 in step 525.

When the femtocell driving control resource ACK message has been received, the macro base station 110 sends a femtocell driving control resource notification message to the SON server 410 in step 527. When the femtocell driving control resource notification message has been received, the SON server 410 forwards the femtocell driving control resource notification message to the femto base station 210 in step 528. That is, the SON server 410 notifies the femto base station 210 of the femtocell driving control resource allocated to the mobile station 310.

After the femtocell driving control resource notification message has been received, the femto base station 210 monitors the femtocell driving control resource for a femtocell driving control message in step 529.

In step 531, the mobile station 310 transmits a femtocell driving control message on the femtocell driving control resource allocated by the macro base station 110. The mobile station 310 transmits the femtocell driving control message at a predetermined transmission power. As described above for FIG. 4, the transmission power can be set to a value such that the femto base station 210 can receive the femtocell driving control message when the mobile station 110 within radio coverage of the femto base station (i.e., femtocell). The femtocell driving control message includes a User Identifier (UID) such that the femto base station 210 can identify the mobile station 310.

When the femtocell driving control message has been received, the femto base station 210 switches on its transmitter in step 533. More specifically, when the femtocell entry of the mobile station 310 has been detected using the femtocell driving control message, the femto base station 210 switches its transmitter from the off-station to the on-state. At this time, the femto base station 210 can verify the registration of the mobile station 310 based on the UID contained in the femtocell driving control message. When it has been verified that the mobile station 310 is registered with the femto base station 210, the femto base station 210 switches on its transmitter. After switching on the transmitter, the femto base station 210 broadcasts the system information by means of the transmitter in step 535.

Consequently, the mobile station 310 connects to the femto base station 210 using the system information, and the femto base station 210 starts serving the mobile station 310. At this time, the mobile station 310 can be served by the macro base station 110 and the femto base station 210, selectively.

As described above for FIG. 4, although FIG. 5 has been described with the macro base station 110 separately transmitting the MS adjacency notification message and the femtocell driving control resource notification message to the SON server 410, the present invention is not limited thereto. That is, the interference control method of as illustrated in FIG. 5 can be implemented without transmission of the MS adjacency ACK message in response to the MS adjacency notification message in step 521.

Further, although the description of FIG. 5 above describes that the femto base station 210 switches on or off only its transmitter, the present invention is not limited thereto. For example, the femto base station 210 may switch on or off both its transmitter and receiver according to the femtocell driving control message transmitted by the mobile station 310. Because the femto base station 201 is connected to the SON server 410 via the backbone network, it can receive the femtocell driving control resource notification message through the backbone network. Accordingly, the femto base station 210 does not need to switch on its receiver for receiving the radio signal. The femto base station 210 can be configured to switch on its receiver as well as the transmitter at step 533. Because the femto base station 210 can receive the femtocell driving control resource notification method without switching on its radio receiver, it is possible to reduce power consumption.

Although it has been described that the macro base station 110 independently allocates the femtocell driving control resource in the above embodiments, the present invention is not limited thereto. For example, the SON server 410 may allocate the femtocell driving control resource as well as relay the radio signal between the macro base station 110 and the femto base station 210.

Figure 6:
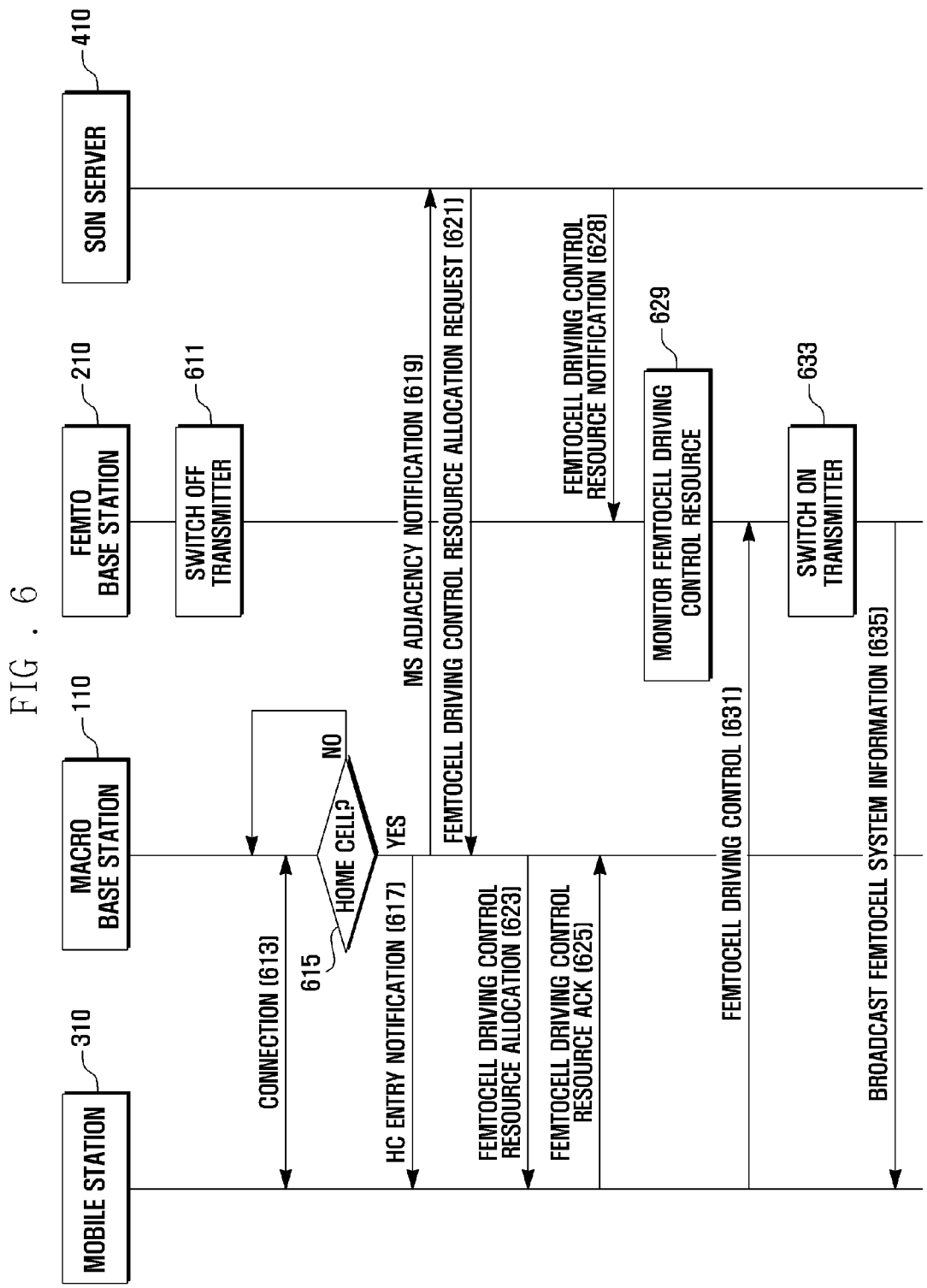
FIG. 6 is a sequence diagram illustrating operations of a mobile terminal, a macro base station, a femto base station, and a SON server in an interference control method according to an embodiment of the present invention.

FIG. 6 is a sequence diagram illustrating operations of a mobile terminal, a macro base station, a femto base station, and a SON server in the interference control method according to an embodiment of the present invention. In FIG. 6, it is assumed that the femto base station 210 is connected to the SON server 410 via the backbone network.

Referring to FIG. 6, steps 611 through 619 are the same as steps 511 through 519. Accordingly, repetitive description of steps 611 through 619 will not be provided.

In step 621, upon receipt of the MS adjacency notification message, the SON server 410 sends a femtocell driving control resource allocation request message to the macro base station 110. More specifically, the SON server 410 determines a resource for a specific purpose of the mobile station 310, e.g., the femtocell driving control resource for the mobile station 310 to transmit the femtocell driving control message (for switching on or off the transmitter of the femto base station 210), and requests the macro base station 110 to allocate the determined resource to the mobile station 310.

When the femtocell driving control resource allocation request message is received, the macro base station 110 sends a femtocell driving control resource allocation message to the mobile station 310 in step 623. That is, the macro base station 110 allocates the resource for the mobile station 310 to transmit a femtocell driving control message.

When the femtocell driving control resource allocation message is received, the mobile station 310 sends a femtocell driving control resource ACK message to the macro base station 110 in step 625.

After transmission of the femtocell driving control resource request message to the macro base station 110, the SON server 410 sends a femtocell driving control resource notification message to the femto base station 210 in step 628. That is, the SON server 410 notifies the femto base station 210 of the femtocell driving control resource allocated to the mobile station 310.

Thereafter, steps 629 through 635 are the same as steps 529 through 535. Accordingly, repetitive description of steps 629 through 635 will not be provided.

The interference control methods for a wireless communication according to the above-described embodiments of the present invention are advantageous in suppressing interference between femto and macro cells. Also, the above-described embodiments of the present invention are capable of preventing the femto base station from unnecessarily transmitting signals, by switching off the femto base station transmitter when no mobile station is located within the femtocell.

Also, the above-described embodiments of the present invention are capable of switching on the transmitter of a femto base station when a registered mobile station is within an available distance from the base station, thereby effectively suppressing inter-cell interference caused by unnecessary transmission. The interference control methods of the present invention actively control interference caused by femtocells within a macrocell.

Although certain embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims and the equivalents thereof.

What is claimed is:

1. An interference control method for mobile station, the method comprising:
    receiving a notification of entry to a home cell from a macro base station, when the mobile station enters a macrocell including a femto base station with which the mobile station is registered; and
    transmitting a femtocell driving control message, including a User Identifier (UID) of the mobile station, to the femto base station at a predetermined transmission power,
    wherein the femto base station switches on a transmitter of the femto base station, which is previously switched off to control interference by the femto base station if a UID registration is verified by the femto base station.

2. The interference control method of claim 1, wherein the predetermined transmission power is set to a level sufficient for the femtocell driving control message to reach a femto base station when the mobile station is within the femtocell.

3. The interference control method of claim 1, further comprising:
    receiving allocation of a femtocell driving control resource to transmit the femtocell driving control message.

4. A mobile station device for interference control, the device comprising:
    a receiver for receiving a notification of entry to a home cell from a macro base station, when the mobile station enters a macrocell including a femto base station with which the mobile station is registered; and
    a transmitter for transmitting a femtocell driving control message, including a User Identifier (UID) of the mobile station, to the femto base station at a predetermined transmission power,
    wherein the femto base station switches on a transmitter of the femto base station, which is previously switched off to control interference by the femto base station if a UID registration is verified by the femto base station.

5. The device of claim 4, wherein the predetermined transmission power is set to a level sufficient for the femtocell driving control message to reach a femto base station when the mobile station is within the femtocell.

6. The device of claim 4, wherein the receiver receives allocation of a femtocell driving control resource to transmit the femtocell driving control message.

7. An interference control method for a macro base station, the method comprising:
    transmitting a notification of entry to a home cell to a mobile station, when the mobile station enters a macrocell including a femto base station with which the mobile station is registered; and allocating a femtocell driving control resource for the mobile station to transmit a femtocell driving control message, including a User Identifier (UID) of the mobile station;

wherein the femto base station switches on a transmitter of the femto base station, which is previously switched off to control interference by the femto base station if a (UID) registration is verified by the femto base station.

8. The interference control method of claim 7, further comprising:

transmitting a notification message to the femto base station of the entry of the mobile station.

9. The interference control method of claim 7, further comprising:

notifying the femto base station of the allocation of the femtocell driving control resource.

10. The interference control method of claim 9, wherein notifying the femto base station of the allocating of the femtocell driving control resource comprises transmitting a notification message through a Self-Organizing Network (SON) server.

11. A macro base station device for interference control, the device comprising:

a transmitter for transmitting a notification of entry to a home cell to a mobile station, when the mobile station enters a macrocell including a femto base station with which the mobile station is registered; and a controller for allocating a femtocell driving control resource for the mobile station to transmit a femtocell driving control message, including a User Identifier (UID) of the mobile base station;

wherein the femto base station switches on a transmitter of the femto base station, which is previously switched off to control interference by the femto base station if a UID registration is verified by the femto base station.

12. The device of claim 11, wherein the transmitter transmits a notification message to the femto base station of the entry of the mobile station.

13. The device of claim 11, wherein the transmitter transmits a notifying message to the femto base station of the allocation of the femtocell driving control resource.

14. The device of claim 13, wherein the transmitter transmits a notifying message to the femto base station of the allocation of the femtocell driving control resource through a Self-Organizing Network (SON) server.

15. An interference control method for a femto base station, the method comprising:

receiving a femtocell driving control message from a mobile station at a predetermined transmission power, wherein the femtocell driving control message includes a User Identifier (UID) of the mobile station;

verifying a registration of the UID; and switching a transmitter of the femto base station on according to the femtocell driving control message wherein the transmitter is previously switched off to control interference if the UID registration is verified by the femto base station.

16. The interference control method of claim 15, further comprising:

receiving a notification message that the mobile station enters a macrocell including the femto base station with which the mobile station is registered.

17. The interference control method of claim 15, further comprising:

receiving a notification message that a femtocell driving control resource is allocated for the mobile station to transmit the femtocell driving control message.

18. A femto base station device for interference control, the device comprising:

a transmitter;

a receiver for receiving a femtocell driving control message from a mobile station at a predetermined transmission power, wherein the femtocell driving control message includes a User Identifier (UID) of the mobile station; and a controller for verifying a registration of the UID and for switching the transmitter of the femto base station on according to the femtocell driving control message wherein the transmitter is previously switched off to control interference if the UID registration is verified by the femto base station.

19. The device of claim 18, wherein the receiver receives a notification message that the mobile station enters a macrocell including the femto base station with which the mobile station is registered.

20. The device of claim 18, wherein the receiver receives a notification message that a femtocell driving control resource is allocated for the mobile station to transmit the femtocell driving control message.

* * * * *